(12) United States Patent
Esaki et al.

(10) Patent No.: US 11,035,314 B2
(45) Date of Patent: Jun. 15, 2021

(54) MACHINE CONTROL SYSTEM

(71) Applicant: Hitachi, Ltd., Tokyo (JP)

(72) Inventors: Kanako Esaki, Tokyo (JP); Kohsei Matsumoto, Tokyo (JP); Kiyoto Ito, Tokyo (JP); Yuzo Shirakawa, Tokyo (JP); Hiroto Naito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/266,815

(22) Filed: Feb. 4, 2019

(65) Prior Publication Data

US 2019/0242326 A1 Aug. 8, 2019

(30) Foreign Application Priority Data

Feb. 6, 2018 (JP) .............................. JP2018-019148

(51) Int. Cl.
*G06G 7/70* (2006.01)
*F02D 41/26* (2006.01)
(Continued)

(52) U.S. Cl.
CPC ....... *F02D 41/263* (2013.01); *F02D 19/0652* (2013.01); *F02D 41/0025* (2013.01);
(Continued)

(58) Field of Classification Search
CPC ............ F02D 41/263; F02D 19/0652; F02D 41/0025; F02D 41/2451; F02D 41/2477; F02D 35/023; F02D 41/2441; F02D 2041/1433; F02D 2200/0614; F02D 2200/0618; G06N 20/00; G05B 13/0265
(Continued)

(56) References Cited

U.S. PATENT DOCUMENTS 7,844,558 B2 * 11/2010 Yuan ................... G05B 23/024
706/45
8,612,107 B2 * 12/2013 Malikopoulos ... B60W 30/1882
701/101
(Continued)

FOREIGN PATENT DOCUMENTS

JP 2012-74007 A 4/2012
JP 2012074007 * 4/2012 .............. Y02P 90/26

*Primary Examiner* — Hung Q Nguyen
*Assistant Examiner* — Anthony Donald Taylor, Jr.
(74) *Attorney, Agent, or Firm* — Crowell & Moring LLP

(57) ABSTRACT

According to one embodiment, a machine control system includes: a selecting unit which acquires a state quantity of a machine converted from data acquired by a sensor provided in the machine to select two or more learning models according to the acquired state quantity; a composing unit which inputs the state quantity acquired by the selecting unit to each of the two or more learning models selected by the selecting unit to calculate a composed value using a command value output from each of the learning models; and a learning unit which outputs a command value with respect to the machine in a range based on the composed value calculated by the composing unit, acquires a state quantity of the machine, searches for a command value of a specific condition from a combination of the output command value and the acquired state quantity, and outputs the searched command value to the machine, thereby creating a new learning model.

14 Claims, 7 Drawing Sheets

(51) Int. Cl.
*F02D 41/00* (2006.01)
*F02D 41/24* (2006.01)
*F02D 19/06* (2006.01)
*G05B 13/02* (2006.01)
*G06N 20/00* (2019.01)
*F02D 35/02* (2006.01)
*F02D 41/14* (2006.01)

(52) U.S. Cl.
CPC ..... *F02D 41/2451* (2013.01); *F02D 41/2477* (2013.01); *F02D 35/023* (2013.01); *F02D 41/2441* (2013.01); *F02D 2041/1433* (2013.01); *F02D 2200/0614* (2013.01); *F02D 2200/0618* (2013.01); *G05B 13/0265* (2013.01); *G06N 20/00* (2019.01)

(58) Field of Classification Search
USPC ........................................................ 701/102
See application file for complete search history.

(56) References Cited

U.S. PATENT DOCUMENTS

| | | | |
|---|---|---|---|
| 2006/0212209 A1* | 9/2006 | Cesario | F02D 35/023 701/106 |
| 2007/0109301 A1* | 5/2007 | Smith | G05B 23/0254 345/440 |
| 2011/0160982 A1* | 6/2011 | Kumar | F02D 41/0025 701/103 |
| 2011/0265773 A1* | 11/2011 | Xu | C10L 1/08 123/703 |
| 2016/0025028 A1* | 1/2016 | Vaughan | F02D 41/263 701/105 |
| 2016/0358099 A1* | 12/2016 | Sturlaugson | G06N 20/00 |
| 2018/0107947 A1* | 4/2018 | Ogawa | B23Q 15/12 |

* cited by examiner

MACHINE CONTROL SYSTEM

BACKGROUND OF THE INVENTION

1. Field of the Invention

The present invention relates to a machine control system.

2. Description of Related Art

Regional energy independence has been recommended in Europe and the United States, and there is a transitional movement to biomass power generation using an agricultural waste or the like, solar power generation, and wind power generation. Since biomass fuels are obtained in association with human economic activity, the availability thereof varies depending on the location and the time. Therefore, it is assumed to use a plurality of types of fuel in a combined manner, and an engine control for power generation coping therewith is required.

In the related art, a control map of multiple control command values including the ignition timing and the air-fuel ratio is manually created for each fuel, and the engine is feedforward-controlled. However, if the engine is controlled by the combination of the plurality of types of fuel, it is complicate to manually create a control map for each of expected combinations of plural fuels and the mixing ratio thereof, and it is difficult to have practical usage due to a high cost.

In this case, the machine learning is also considerable by modeling the engine. There is a technique of detecting an abnormal state of a system by repeatedly applying and removing a kernel to and from a regression model to refine the regression model. For example, the technique is described in U.S. Pat. No. 7,844,558.

In addition, there is a technique of obtaining an optimum operating condition using linear programming when a regression model of the operation state and the operation index of a plant is linear or using quadratic programming when the regression model are non-linear. For example, the technique is described in JP-A-2012-074007.

In the technique described in U.S. Pat. No. 7,844,558, replacing and adding the learning data or the kernel result in improvement in accuracy of abnormality determination while operating the target device. However, when a machine such as an engine is controlled, there is also a possibility that the newly obtained learning data does not necessarily include data that satisfies a specific condition from the beginning, and sufficient accuracy cannot be obtained for a specific condition.

In the technique described in JP-A-2012-074007, a regression model under the whole operating conditions of the plant is created to optimize the operating condition, thereby calculating the optimum operating condition. However, when a machine such as an engine is controlled, it is difficult to create a large number of learning models in advance for practical use.

SUMMARY OF THE INVENTION

According to the above, an object of the present invention is to obtain a command value that satisfies a specific condition even when a small number of learning models is used in controlling of a machine such as an engine.

In the invention, an outline of exemplary embodiments will be briefly described as follows. A machine control system includes: a selecting unit which acquires a state quantity of a machine converted from data acquired by a sensor provided in the machine to select two or more learning models according to the acquired state quantity; a composing unit which inputs the state quantity acquired by the selecting unit to each of the two or more learning models selected by the selecting unit to calculate a composed value using a command value output from each of the learning models; and a learning unit which outputs a command value with respect to the machine in a range based on the composed value calculated by the composing unit, acquires a state quantity of the machine, searches for a command value of a specific condition from a combination of the output command value and the acquired state quantity, and outputs the searched command value to the machine, thereby creating a new learning model.

According to the invention, it is possible to obtain a command value satisfying a specific condition by only using a small number of learning models in controlling of a machine such as an engine.

DESCRIPTION OF EMBODIMENTS

Figure 1:
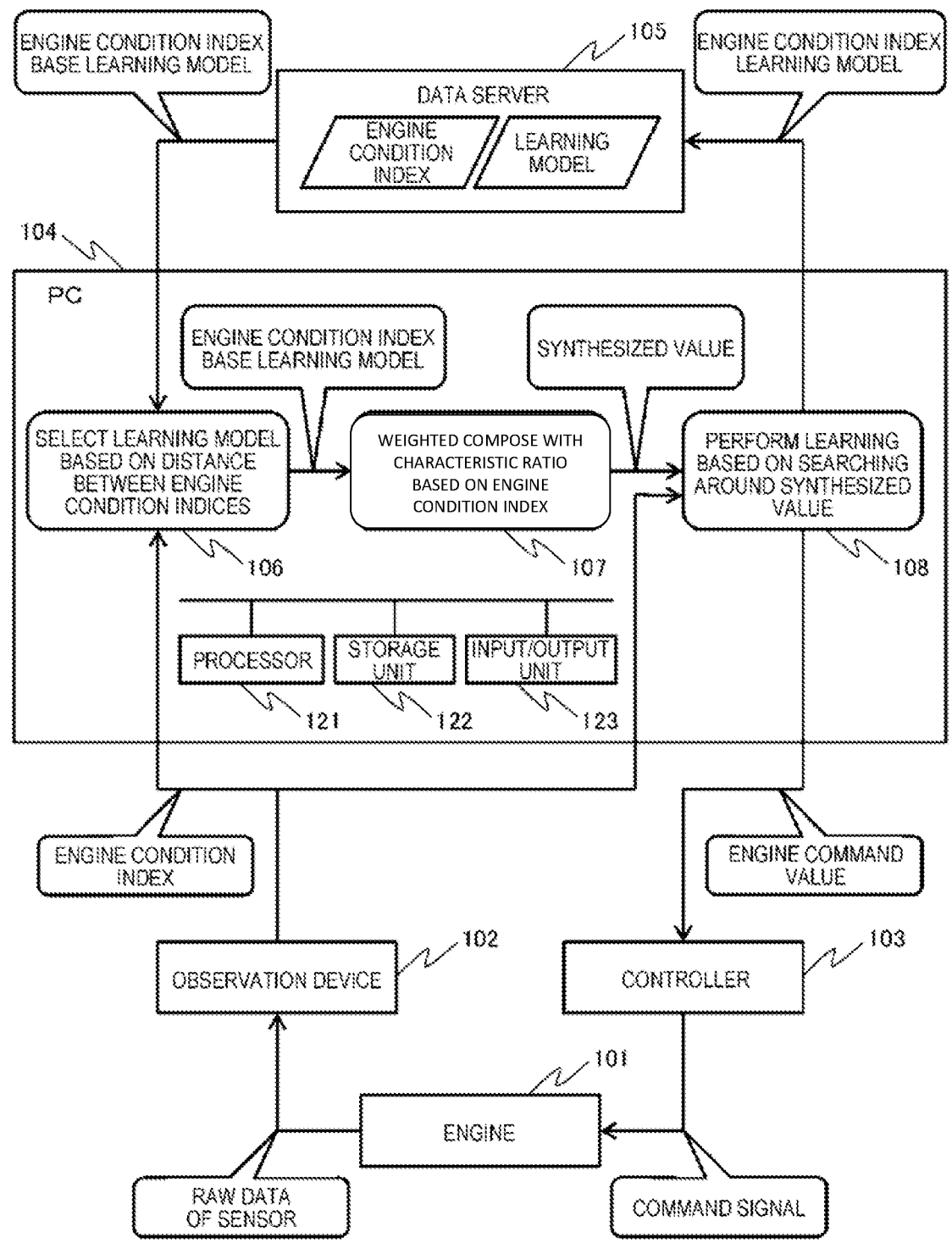
FIG. 1 is a diagram illustrating a configuration example of an engine system including composition of outputs of learning models.

Hereinafter, embodiments will be described with reference to the drawings. In FIGS. 1 to 6 for describing the embodiments, the corresponding elements having the same function are given the same reference numerals, and the repetitive description thereof will be omitted.

First Embodiment

FIG. 1 is a diagram illustrating a configuration example of an engine system according to a first embodiment. The engine system includes an engine 101, an observation device 102, a controller 103, a PC 104 (engine control device), and a data server 105.

The observation device 102 acquires raw data from a sensor provided in the engine 101, converts the data into an engine condition index indicating the combustion state of the engine 101, and outputs the index to the PC 104. The controller 103 converts an engine command value acquired from the PC 104 into a command signal and outputs the signal to the engine 101. The observation device 102 may include an analog-to-digital converter, and the controller 103 may include a digital-to-analog converter.

In the data server 105, a learning model and a label thereof are stored, the learning model including an engine condition index as an input and an engine command value as an output. The learning model is created for each operating condition of the engine 101. The learning model may include a combination of an engine index and a target index as an input.

Here, the label is a representative value of the engine condition indices of a data set used to create the learning model. The target index is an index as a target to which the engine condition index is to be closer by changing the engine command value to change the engine condition index, and is input from the outside of the PC 104.

The PC 104 includes a learning model selecting unit 106, a composing unit 107, and a learning unit 108. Based on the engine condition index input from the observation device 102, the learning model selecting unit 106 selects and acquires a group of base learning models which is learning models to be used in the learning unit 108 among the learning models stored in the data server 105.

The composing unit 107 composes the output values of the group of base learning models. The learning unit 108 searches for an engine command value with the maximum thermal efficiency in the peripheral region of the output value composed by the composing unit 107, outputs the engine command value to the controller 103, generates a learning model, and stores the learning model in the data server 105.

The PC 104 is a computer including a processor 121, a storage unit 122, and an input/output unit 123. The storage unit 122 may include a memory or a secondary storage device, and the input/output unit 123 may include a serial interface, a parallel interface, or a network interface.

One or more of the learning model selecting unit 106, the composing unit 107, and the learning unit 108 may be implemented by a dedicated circuit or may be implemented by the processor 121 that executes a program stored in the storage unit 122.

Figure 2:
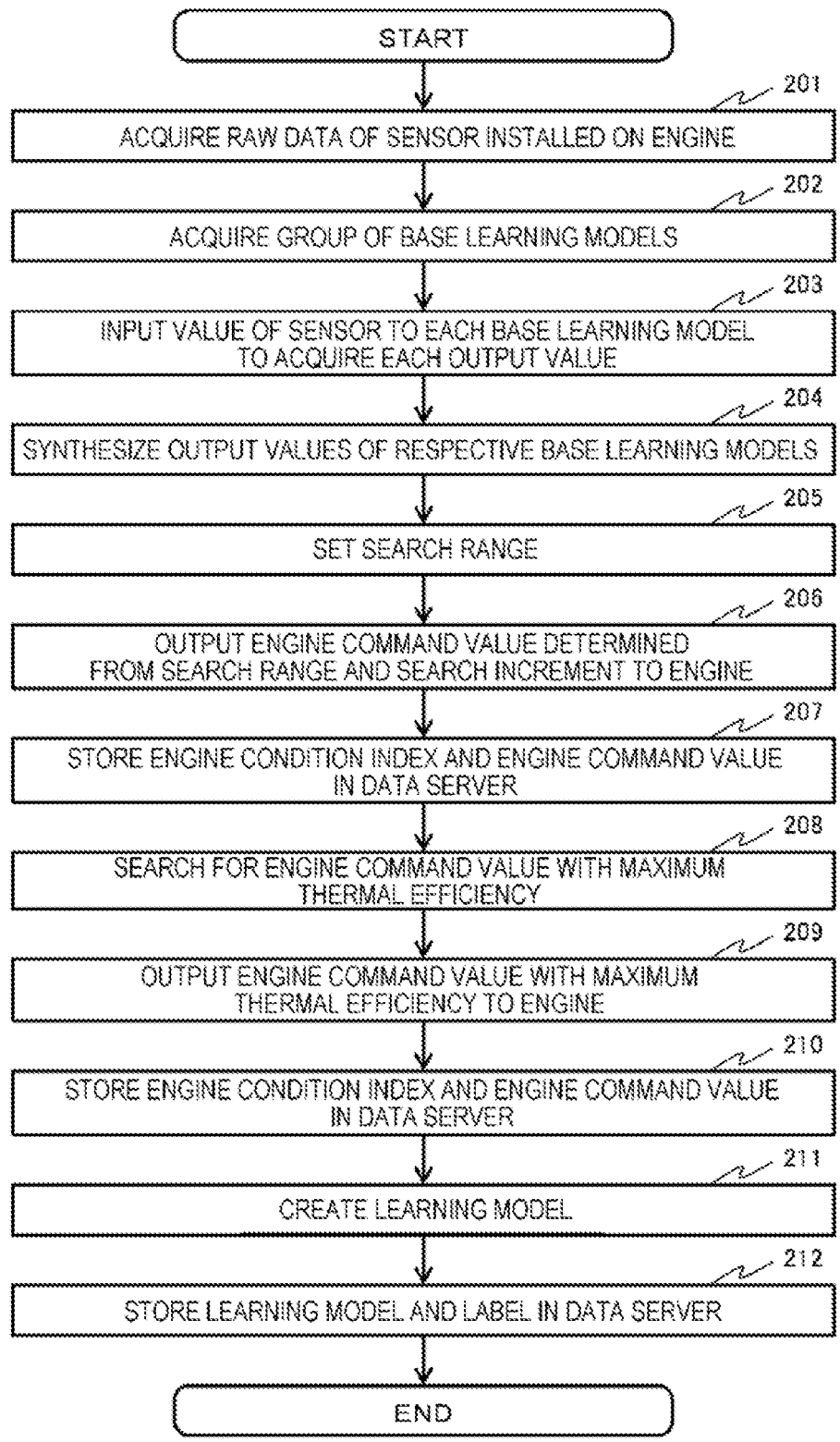
FIG. 2 is a diagram illustrating an example of a process flowchart according to a first embodiment.

FIG. 2 is a diagram illustrating an example of a process flowchart of the engine system in this embodiment. In step 201, the observation device 102 acquires raw data of the sensor provided in the engine 101 for one control cycle.

For example, a pressure sensor for detecting the in-cylinder pressure of the engine 101 is used as the sensor. The maximum value of the raw data of the pressure sensor for one control cycle is output to the PC 104 as an engine condition index. In one control cycle, four strokes including intake, compression, explosion, and exhaust of the engine may be set as one cycle.

The sensor is not necessarily a pressure sensor, but may be any sensor, such as a strain sensor, a microphone, a temperature sensor, a flowmeter for fuel or air, an encoder that detects the engine speed, or a torque sensor that detects the axial torque of the engine 101 as long as it detects the combustion state of the engine 101. A plurality of sensors may be provided in the engine 101, and a plurality of raw data of the plurality of sensors may be acquired.

The engine condition index is not necessarily the maximum value of the raw data of the pressure sensor, and may be, for example, a combination of a plurality of raw data of the pressure sensor or a combination of the raw data of the pressure sensor and a value acquired from another sensor, as long as the value corresponds to the type of data of the engine condition index to be input to the learning model stored in the data server 105. Alternatively, the learning model to be acquired in step 202 may be selected according to the type of data of the engine condition index acquired in step 201.

In step 202, the learning model selecting unit 106 acquires the group of base learning models from the data server 105. That is, two or more learning models are acquired as the group of base learning models in ascending order of the distance between the engine condition index output from the observation device 102 in step 201 and the engine condition index of the label for the plurality of learning models stored in the data server 105.

Part of the plurality of engine condition indices acquired in step 201 may be used in step 202. Also, not only the engine condition index, but also a target index such as the required torque (required pressure), or a combination of the engine condition index and the target index may be used in step 202.

Further, a plurality of learning models stored in the data server 105 may be acquired at any conditions instead of being based on the distance between the engine condition index output from the observation device 102 and the engine condition index of the label for the plurality of learning models.

The distance between the engine condition indices may be a distance calculated from a plurality of values of a plurality of engine condition indices of the same type according to a preset calculation formula. In addition, the distance between the engine condition indices may be a distance calculated by multiplying a weight to a plurality of values of a plurality of different types of engine condition indices according to a preset calculation formula, the weight being set in advance for a combination of the plurality of different types of engine condition indices.

In step 203, the composing unit 107 inputs the engine condition index acquired in step 201 to each base learning model acquired in step 202 to acquire respective output values. In step 204, the composing unit 107 composes the output values of the respective base learning models.

The calculation of the composing of the output values is, for example, a calculation of the weighted average value using a composition weight set for each base learning model. For the composition weight, the characteristic ratio is used which is obtained from the engine condition indices of the data set used for creating each base learning model.

For example, when the base learning models are two models A and B, and the ratio (characteristic ratio) of the in-cylinder pressure maximum value of the data set used for creation is A:B=3:2, the composition weight W(A) of the model A is three and the composition weight W(B) of the model B is two. However, the characteristic ratio is not limited to the ratio of the in-cylinder pressure maximum value, but may be a ratio obtained from an engine condition index such as a ratio of an engine torque.

Assuming that the value of the engine condition index of the model A is S(A), the value of the engine condition index of the model B is S(B), the output value of the model A is O(A), the output value of the model B is O(B), and the value of the engine condition index in the current control cycle is S(T), the weighted average value AVE is calculated as follows.

$$AVE = \frac{O(A) \times W(A) \times |S(T) - S(B)| + O(B) \times W(B) \times |S(T) - S(A)|}{W(A) \times |S(T) - S(B)| + W(B) \times |S(T) - S(A)|} \quad [\text{Math. 1}]$$

However, the calculation of the weighted average value is not limited to the expression above.

Further, the output value obtained by the composition is not limited to the weighted average value, but may be an average value without being weighted or a value obtained by correcting an average value or a weighted average value with an engine condition index or the like. Alternatively, an average value of parameters of the base learning models or the like may be used to create a new learning model, and an engine condition index may be input to the learning model to calculate an output value.

In step 205, the learning unit 108 sets a search range based on the output value composed in step 204. The search range is set with the output value calculated in step 204 as the center value so that the search range has a preset search width. The output value calculated in step 204 is not necessarily the center value, and the search range may be set with the output value calculated in step 204 as the boundary value.

The search width is not necessarily fixed to the preset search width, and a table or calculation formula for setting the search width based on the output value calculated in step 204 or the engine condition index may be set in advance.

Further, the search increment may be set in advance. Alternatively, the search increment is not necessarily fixed to the preset search increment, and a table or a calculation formula for setting the search increment based on the output value calculated in step 204 or the engine condition index may be set in advance.

In step 206, the learning unit 108 sequentially outputs the engine command value determined from the search range set in step 205 and the search with the search increment set in advance to the controller 103, and the controller 103 converts the value into a command signal to output the signal to the engine 101. That is, a plurality of engine command values are sequentially determined and output while shifting the engine command value by the search increment from the boundary value (the value at the end of the range) of the search range.

As a result, the engine command values are output as many as the number by which the search width is divided by the search increment in step 206. The value to be output to the controller 103 is not necessarily the engine command value determined from the search range and the search increment, but may be a value obtained by adding noise to the engine command value.

Since one determined engine command value is output a plurality of times and noise is added to each output, an engine command value is output which cannot be determined only from the search increment due to the assignment of the same engine command value. In addition, there is a possibility that shifting may occur in the combustion state of the engine 101, so that the same engine command value may be output a plurality of times regardless of the addition of noise.

The engine command value may be a value of commanding to control one or both of the ignition timing and the air-fuel ratio of the engine 101. The value of commanding to control the air-fuel ratio may include a value of the injection start timing and the injection timing of the fuel, or a value of the injection amount of the fuel. The engine command value is not limited to these values, but may be any value as long as the value used for controlling the combustion state of the engine 101.

In step 206, the learning unit 108 further is input with the state of the engine 101 with respect to the output engine command value from the observation device 102 as an engine condition index. In step 207, the learning unit 108 stores a combination of the plurality of engine command values output to the controller 103 and the plurality of engine condition indices input from the observation device 102 in the data server 105 as a data set for searching.

In step 208, the learning unit 108 searches for the engine command value with the maximum thermal efficiency from the data set for searching stored in step 207. When the engine command value with the maximum thermal efficiency is found by searching, the learning unit 108 may repeatedly perform the process of setting a new search range based on the found engine command value to search for a new engine command value and storing the data set for searching in the data server 105 to search for an engine command value with the maximum thermal efficiency.

The process for finding the engine command value with the maximum thermal efficiency is not limited to the above process in which the search range and the search increment are preset and the searching is repeatedly performed. In this process, for example, the search may be repeatedly performed while gradually decreasing the search increment.

In this process, in order to reduce the number of pieces of data to be searched for, the search range may be narrowed down by estimating the occurrence probability distribution as the data of the engine command value with the maximum thermal efficiency, a reinforcement learning may be introduced to the searching, or the margin of the operating condition within the search range may be set based on information acquired by any sensor.

In step 209, the learning unit 108 outputs one engine command value with the maximum thermal efficiency to the controller 103 for 1,000 control cycles. The number of output control cycles is not necessarily 1,000, and may be any number as long as it is necessary for creating a learning model. In step 209, the engine command values may be output by a larger number than the number of outputs when the same engine command value is output a plurality of times in step 206.

In step 209, the learning unit 108 is further input the state of the engine 101 with respect to the output engine command value from the observation device 102 as an engine condition index. In step 210, the learning unit 108 stores a combination of the plurality of engine command values output to the controller 103 and the plurality of engine condition indices input from the observation device 102 in the data server 105 as a data set for learning.

In step 211, the learning unit 108 creates a learning model using the data set for learning. The learning unit 108 may create a learning model by learning parameters using the data set for learning with the parameters of the base learning models as initial values, instead of newly creating a learning model.

In step 212, the learning unit 108 creates a label for the created learning model and stores the label in the data server 105. The stored learning model is one of the base learning models in the subsequent process.

As described above, according to the embodiment, it is possible to compose the outputs of two learning models according to the characteristic ratio of the state indices of the two learning models even when there are only two learning models, thereby obtaining output values which cannot be output from each of the two learning models as a composed value.

Then, the searching is performed based on the obtained composed value, so that the data set for searching is stored and the command value with the maximum thermal efficiency is searched for in the data set for searching, whereby it is possible to obtain a command value with the maximum thermal efficiency which cannot be obtained from the composed value. It is also possible to create a new learning model using the command value with the maximum thermal efficiency.

Second Embodiment

Figure 3:
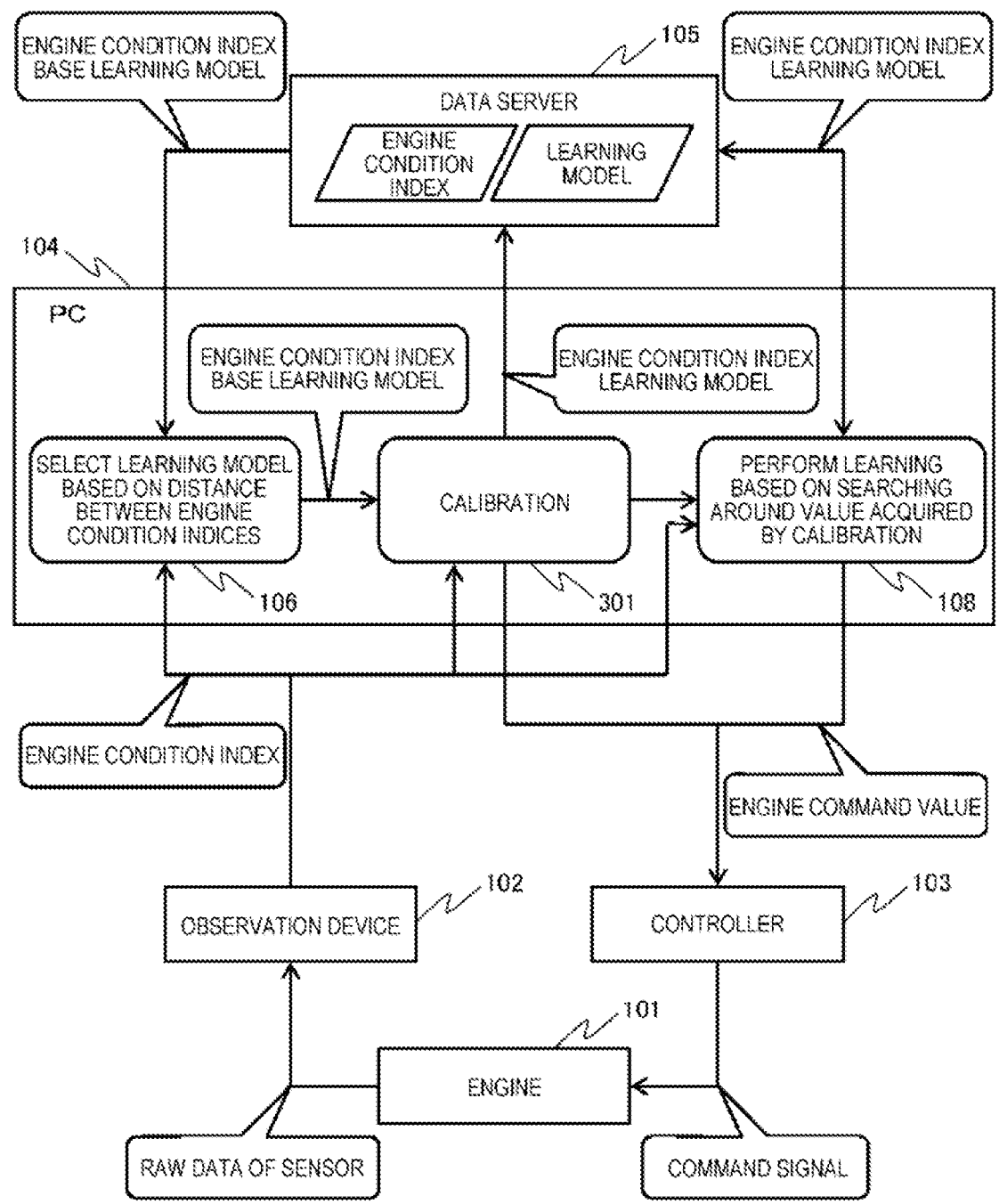
FIG. 3 is a diagram illustrating a configuration example of an engine system including calibration.

In a second embodiment, an example will be described in which an engine command value not causing abnormal combustion is acquired for each operating condition in order to set the search range. In the embodiment, the difference from the first embodiment will be mainly described, and the same description as in the first embodiment will be omitted. FIG. 3 is a diagram illustrating a configuration example of an engine system of this embodiment.

The PC 104 illustrated in FIG. 3 includes a calibration unit 301 in addition to the learning model selecting unit 106 and the learning unit 108 illustrated in FIG. 1. After the engine 101 is started, the calibration unit 301 acquires an engine command value not causing abnormal combustion in the range of preset operating condition. Illustration of the processor 121, the storage unit 122, and the input/output unit 123 illustrated in FIG. 1 is omitted.

The operating condition may be any condition as long as it affects the operation of the engine 101. For example, as long as the engine operates by burning a plurality of types of fuel, the condition may be a mixing ratio of the plurality of types of fuel, but the condition is not limited thereto. In addition, a range, in which abnormal combustion does not occur, of the operating condition may be set in advance from the outside of the PC 104.

Figure 4A:
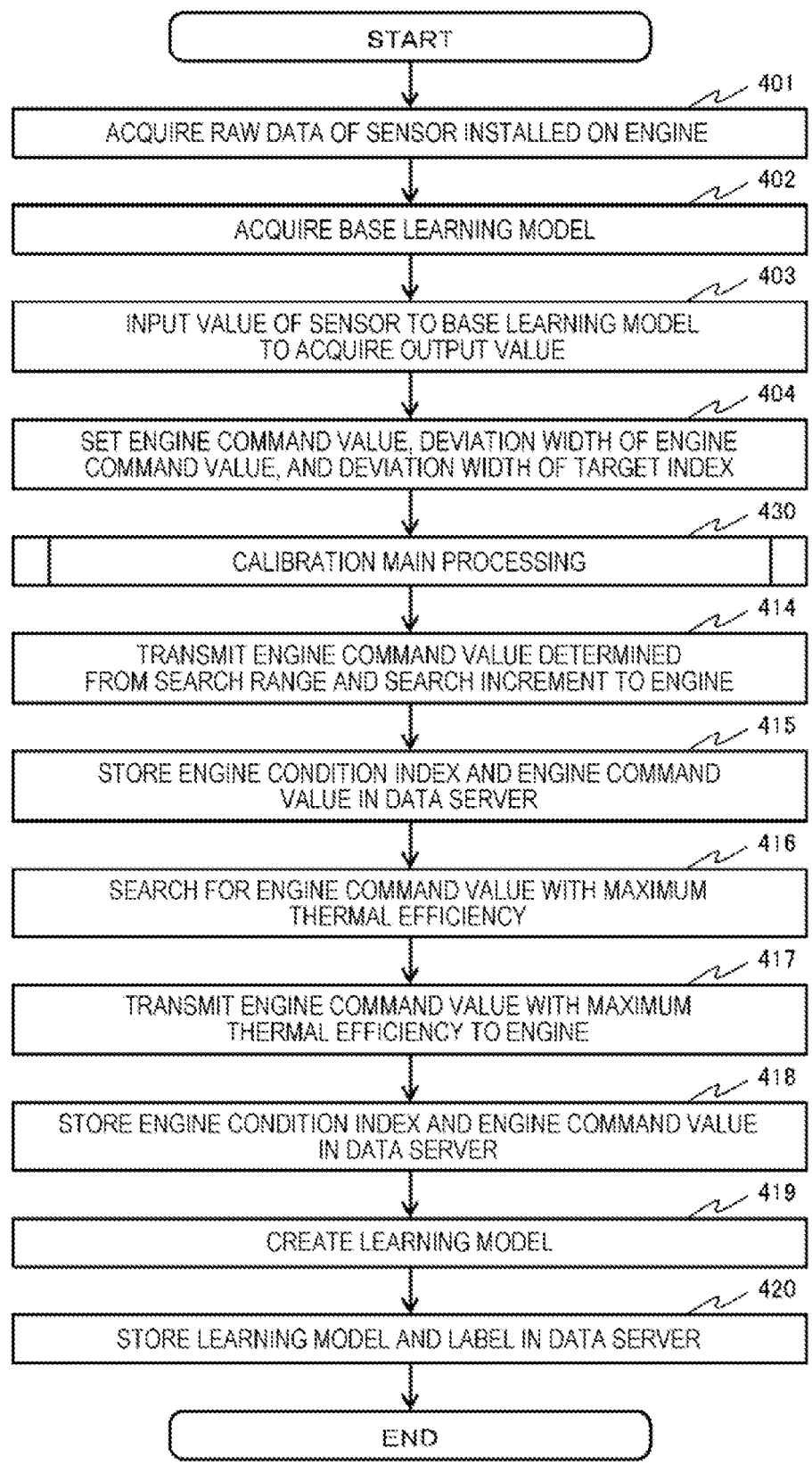
FIG. 4A is a diagram illustrating an example of a process flowchart according to a second embodiment.
Figure 4B:
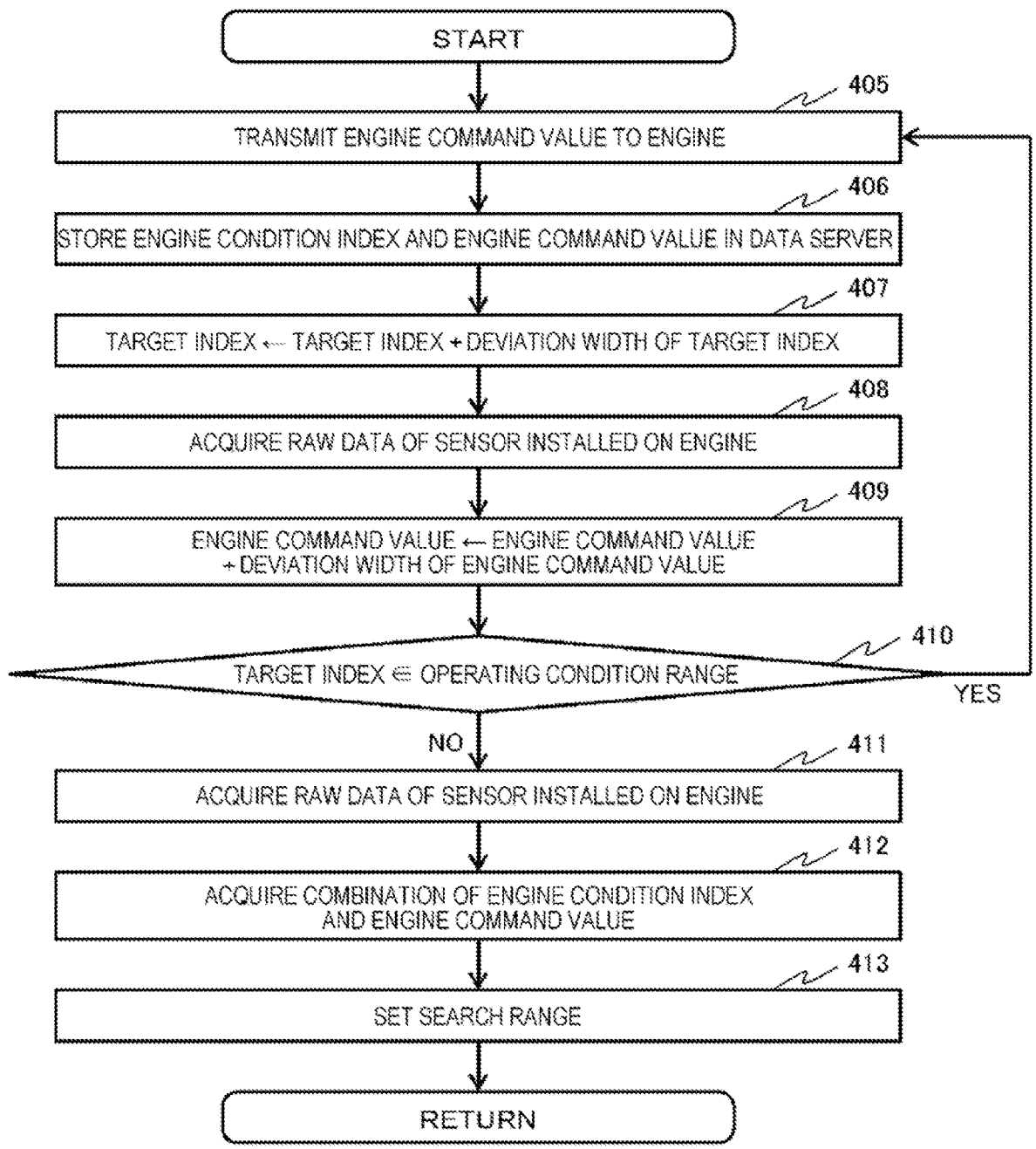
FIG. 4B is a diagram illustrating the example of the process flowchart according to the second embodiment.

FIGS. 4A and 4B are diagrams illustrating an example of a process flowchart of the engine system according to the embodiment. The process of step 401 illustrated in FIG. 4A is the same as that of step 201 described with reference to FIG. 2. In step 402, the learning model selecting unit 106 acquires a base learning model from the data server 105.

That is, the learning model selecting unit 106 acquires the learning model having the shortest distance between the engine condition index output from the observation device 102 in step 401 and the engine condition indices of the labels of the plurality of learning models stored in the data server 105 as a base learning model.

Part of the plurality of engine condition indices acquired in step 401 may be used in step 402. Not only the engine condition index, but also a target index such as a required torque or a combination of the engine condition index and the target index may be used in step 402.

In step 403, the calibration unit 301 inputs the engine condition index acquired in step 401 to the base learning model acquired in step 402 to obtain the output value. In step 404, the calibration unit 301 stores the output value acquired in step 403 as an engine command value, and sets the deviation width of the engine command value and the deviation width of the target index.

Each of the deviation width of the engine command value and the deviation width of the target index may be set by the calibration unit 301 based on the value of the deviation width previously input to the PC 104.

Then, the processing of step 430 is executed, and the description thereof will be given with reference to FIG. 4B. In step 405 illustrated in FIG. 4B, the calibration unit 301 outputs the stored engine command value to the controller 103, and the controller 103 converts the output engine command value into a command signal and outputs the signal to the engine 101.

In step 405, the calibration unit 301 is further input with the state of the engine 101 with respect to the output engine command value from the observation device 102 as an engine condition index. In step 406, the calibration unit 301 stores the combination of the engine condition index input from the observation device 102 and the command value output to the controller 103 as the calibration data set in the data server 105.

In step 407, the calibration unit 301 adds the deviation width of the target index to the target index to be updated, and stores the updated target index as a new target index. The process of step 408 is the same as that of step 401. In step 409, the calibration unit 301 adds the deviation width of the engine command value to the stored engine command value to be updated, and stores the updated command value as a new engine command value.

In step 410, the calibration unit 301 determines whether the stored target index is within the operating condition range of the engine 101. If it is determined that the stored target index is within the operating condition range, the process returns to step 405, and if it is determined that the target index is not within the range, the process proceeds to step 411.

A sensor for detecting abnormal combustion may be provided in the engine 101 and raw data of the sensor may be converted into an engine condition index relating to the presence or absence of abnormal combustion detection in the observation device 102. The calibration unit 301 may be continuously input with an engine condition index relating to the presence or absence of abnormal combustion detection from the observation device 102 to determine a range where abnormal combustion is not detected.

In step 410, instead of determining whether the stored target index is within the operating condition range of the engine 101, the calibration unit 301 may determine whether the target index is within the range where abnormal combustion is not detected, or may determine whether the stored target index is within the operating condition range of the engine 101 and the range where abnormal combustion is not detected.

Step 411 is the same process as step 401. In step 412, the learning unit 108 acquires, from the calibration data stored in the data server 105, a combination of the engine condition index and the engine command value closest to the engine condition index output from the observation device 102 in step 411.

In step 413, the learning unit 108 sets the search range in the same manner as in step 205 described with reference to FIG. 2, based on the engine command value acquired in step 412. Returning to FIG. 4A, processes of steps 414 to 420 are the same as those of steps 206 to 212 described with reference to FIG. 2.

As described above, according to the embodiment, it is also possible to avoid abnormal combustion when searching for a command value that maximizes thermal efficiency.

Third Embodiment

In a third embodiment, another example of acquiring the engine command value not causing abnormal combustion for each operating condition will be described. Since the configuration example of an engine system of this embodiment is the same as that of the second embodiment, the description thereof will be given with reference to FIG. 3 and new illustration thereof will be omitted.

Figure 5:
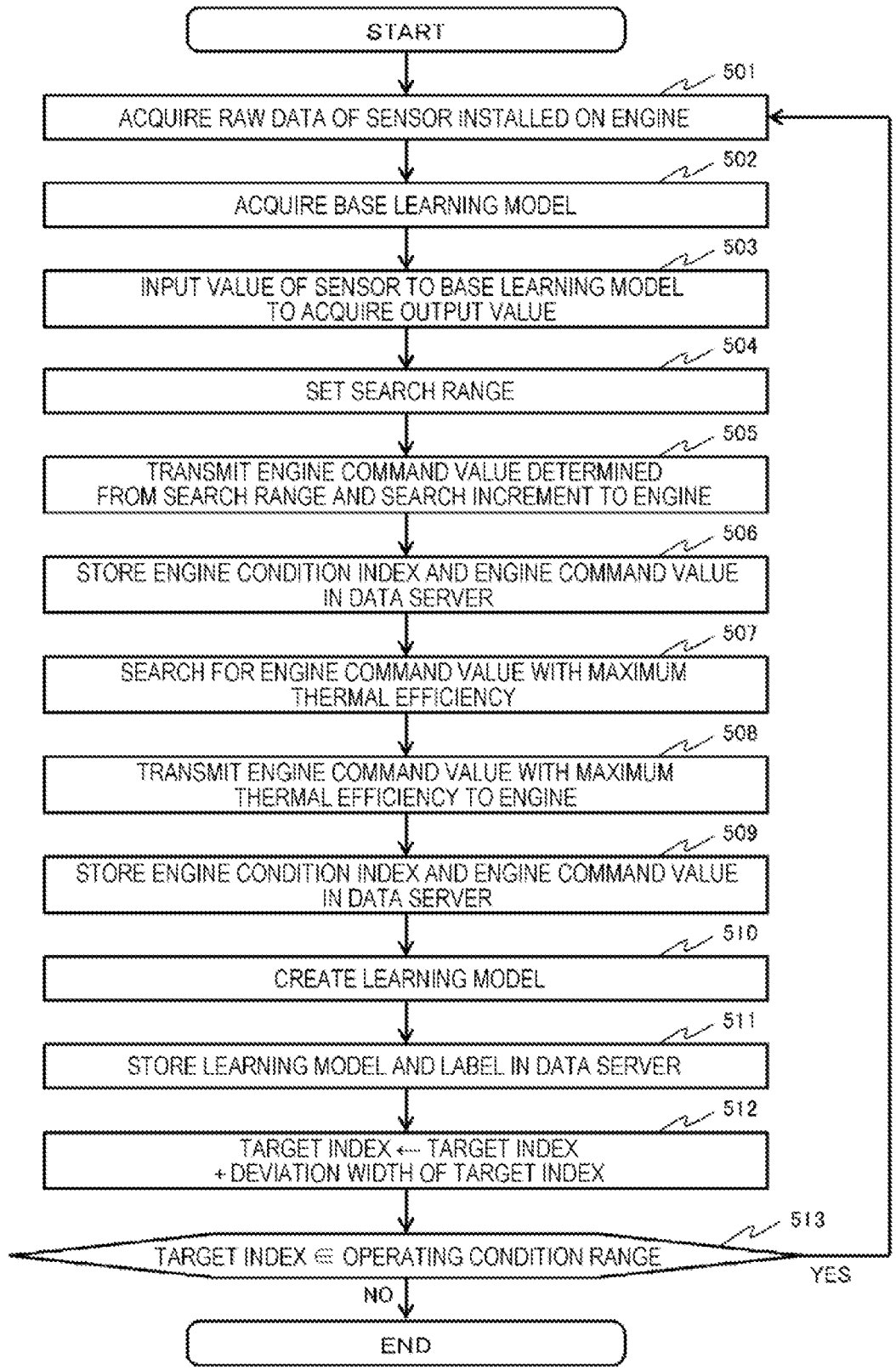
FIG. 5 is a diagram illustrating an example of a process flowchart according to a third embodiment.

FIG. 5 is a diagram illustrating an example of a process flowchart of the engine system according to the embodiment. The processes of steps 501 and 502 are the same as those of steps 401 and 402 illustrated in FIG. 4A. In step 503, the calibration unit 301 inputs the combination of the engine condition index acquired in step 501 and the stored target index into the base learning model acquired in step 502, and acquires an output value.

In step 504, the learning unit 108 sets a search range in the same manner as in step 413, based on the engine command value acquired in step 503. The processes of steps 505 to 511 are the same as those of steps 414 to 420 illustrated in FIG. 4A. Each of processes of steps 512 and 513 is the same as that of steps 407 and 410 illustrated in FIG. 4B. The deviation width of the target index is set in advance before step 501.

As described above, according to the embodiment as in the second embodiment, it is also possible to avoid abnormal combustion when searching for a command value that maximizes thermal efficiency.

Fourth Embodiment

In a fourth embodiment, based on the engine condition index output from the observation device 102, an example will be described whether to select the setting of the search range based on the output value obtained by composing the outputs of two or more base learning models or the setting of the search range based on the output value of one base learning model. Since the configuration example of the engine system of the embodiment is the same as that of the first embodiment, the description thereof will be given with reference to FIG. 1 and new illustration thereof will be omitted.

Figure 6:
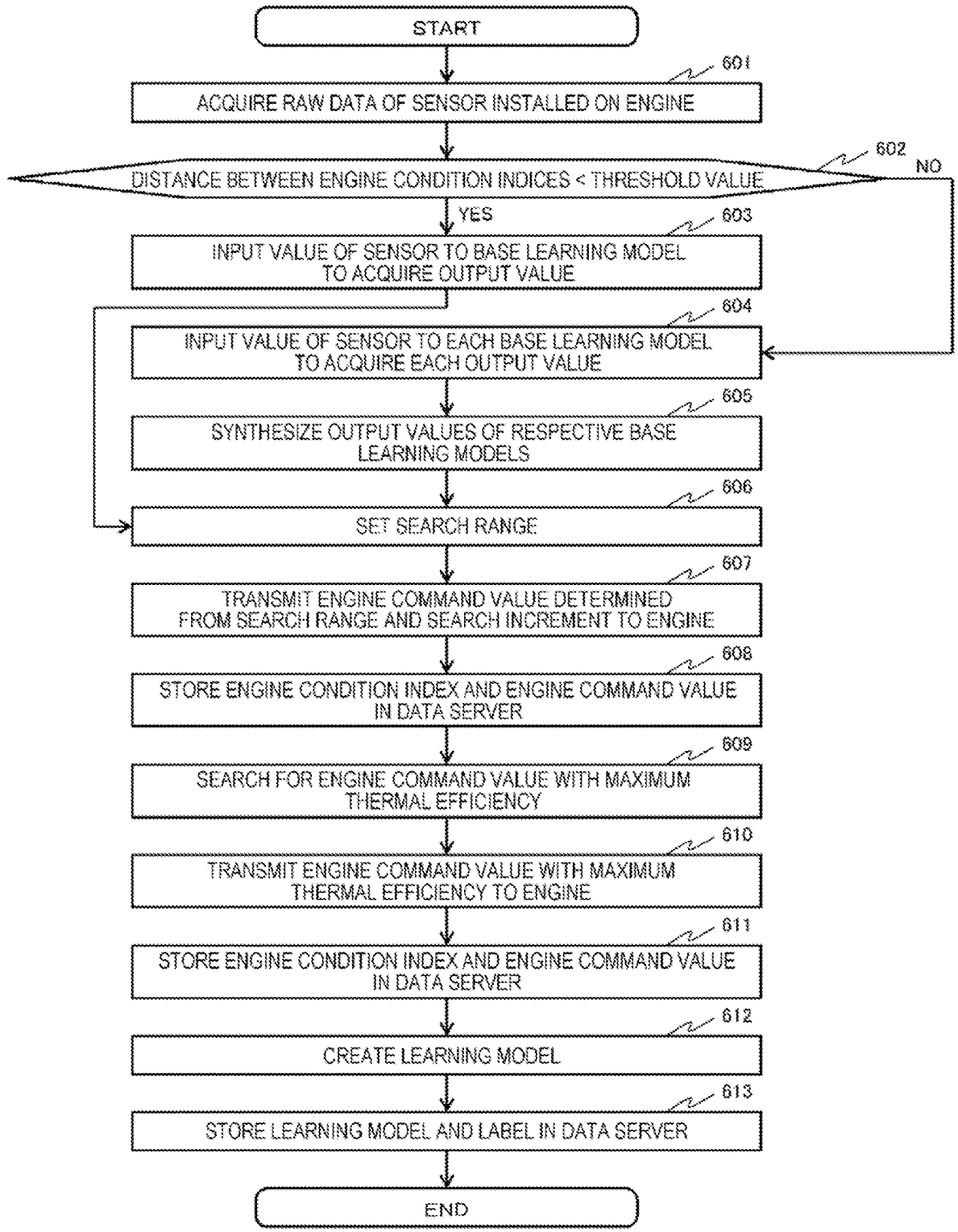
FIG. 6 is a diagram illustrating an example of a process flowchart according to a fourth embodiment.

FIG. 6 is a diagram illustrating an example of a process flowchart of the engine system according to the embodiment. The process of step 601 is the same as that of step 201 described with reference to FIG. 2. In step 602, the learning model selecting unit 106 acquires a group of base learning models from the data server 105.

Then, the learning model selecting unit 106 determines whether the shortest distance between the engine condition index output from the observation device 102 in step 601 and the engine condition indices of the labels of the plurality of learning models stored in the data server 105 is smaller than a preset threshold value.

If it is determined that the shortest distance is smaller than the threshold value, the learning model selecting unit 106 acquires the learning model of the shortest distance as the base learning model and the process proceeds to step 603. When it is determined that the shortest distance is not smaller than the threshold value, two or more learning models are acquired as the group of base learning models in ascending order of the distance, and the process proceeds to step 604.

Part of the plurality of engine condition indices acquired in step 601 may be used in step 602. Further, not only the engine condition index, but also a target index such as the required torque, or a combination of the engine condition index and the target index may be used in step 602.

In step 603, the learning unit 108 inputs the engine condition index acquired in step 601 to the base learning model acquired in step 602 to acquire the output value, and the process proceeds to step 606. The processes of steps 604 to 613 are the same as those of steps 203 to 212 described with reference to FIG. 2.

As described above, according to the present embodiment, when a learning model matching with the combustion state of the engine is stored in the data server, composition processing becomes unnecessary, and the time required for searching is shortened.

What is claimed is:

1. A machine control system comprising:
   a memory storing a program configured to create a new learning model for the machine control system; and
   a processor configured to execute the program, which when executed causes the processor to:
   receive data from a sensor provided in a machine, the sensor configured to detect physical quantities of the machine during an operation of the machine;
   determine a state of the machine based on the data received from the sensor and select two or more learning models according to the state of the machine;
   input a machine condition index, which is determined based on the data received from the sensor and corresponds to the state of the machine, to each of the two or more learning models, and calculate a composed value that is a weighted average of command values output from the two or more learning models;
   control the operation of the machine by outputting to the machine a first command value of the command values based on the composed value calculated;
   determine a second command value of the command values that corresponds to a maximum thermal efficiency of the machine from a combination of the first command value and the machine condition index, and output the second command value to the machine;
   control the operation of the machine based on the second command value output to the machine; and
   create the new learning model based on a relationship between a plurality of values for the second command value that are output to the machine and a plurality of values for the machine condition index that are determined from the data received from the sensor.

2. The machine control system according to claim 1, wherein
   the processor calculates the weighted average of the command values output from the respective learning models with characteristic ratios of the machine condition index input to each of the two or more learning models.

3. The machine control system according to claim 2, wherein
   after creating the new learning model, the processor selects the two or more learning models in an ascending order of a distance between the machine condition index and a label for the new learning model.

4. The machine control system according to claim 3, wherein
   the processor sets a search range of a preset search width with the composed value calculated as a center value, outputs a command value determined from the set search range and a preset setting increment, acquires the machine condition index corresponding to the state of the machine, and generates a combination of the output command value determined and the machine condition index.

5. The machine control system according to claim 4, wherein the processor
   repeatedly outputs one command value determined from the set search range and the preset setting increment for a first setting number of times, and repeatedly outputs the one command value for a second setting number of times larger than the first setting number of times.

6. The machine control system according to claim 1, wherein
the machine is an engine which burns fuel,
the processor determines the state of the machine based on a combustion in the engine, and
the respective command values includes an air-fuel ratio or an ignition timing.

7. The machine control system according to claim 6, wherein
the engine burns two or more types of fuel, and
the processor calculates the weighted average of the command values output from the two or more learning models with a characteristic ratio of the machine condition index according to the combustion in the engine.

8. The machine control system according to claim 7, wherein
after creating the new learning model, the processor selects the two or more learning models in an ascending order of a distance between the machine condition index and a label for the new learning model.

9. The machine control system according to claim 8, wherein
the processor sets a search range of a preset search width with the composed value calculated as a center value, outputs a command value determined from the set search range and a preset setting increment, acquires the machine condition index corresponding to the state of the machine, and generates a combination of the output command value determined and the machine condition index.

10. The machine control system according to claim 9, wherein the processor
repeatedly outputs one command value determined from the set search range and the preset setting increment for a first setting number of times, and
repeatedly outputs the one command value for a second setting number of times larger than the first setting number of times.

11. A machine control system comprising:
a memory storing a program configured to create a new learning model for the machine control system; and
a processor configured to execute the program, which when executed causes the processor to:
determine a state of a machine based on data acquired by a sensor provided in the machine and select a learning model according to the state of the machine;
input a first machine condition index, which is determined based on the data acquired by the sensor and corresponds to the state of the machine, to the learning model, store a first command value output from the learning model, and generate calibration data within an operating condition range based on the first command value;
control an operation of the machine with respect to the operating condition range by outputting to the machine the first command value,
search for a second command value that corresponds to a maximum thermal efficiency of the machine from a combination of the first command value and the first machine condition index, and output the second command value to the machine;
control the operation of the machine based on the second command value output to the machine; and
create the new learning model based on a relationship between a plurality of values for the second command value that are output to the machine and a plurality of values for the first machine condition index that are determined from the data acquired by the sensor.

12. The machine control system according to claim 11, wherein the processor
acquires a second machine condition index, employs a combination of the second command value and the second machine condition index as calibration data, updates a target index with a target index deviation width and the first command value with a command value deviation width, stores the updated first command value, and generates calibration data within the operating condition range based on the updated first command value, and
repeatedly generates the calibration data as long as the updated target index is within the operating condition range.

13. The machine control system according to claim 11, wherein
the machine is an engine which burns fuel,
the processor determines the state of the machine according to a combustion in the engine, and
the respective command values includes an air-fuel ratio or an ignition timing.

14. The machine control system according to claim 13, wherein the processor
acquires a second machine condition index, employs a combination of the second command value and the second machine condition index as calibration data, updates a target index with a target index deviation width and the first command value with a command value deviation width, stores the updated first command value, and generates calibration data within the operating condition range based on the updated first command value, and
repeatedly generates the calibration data as long as the updated target index is within the operating condition range.

* * * * *